(12) United States Patent
Kim

(10) Patent No.: US 7,458,594 B2
(45) Date of Patent: Dec. 2, 2008

(54) LOWER ARM MOUNTING STRUCTURE OF VEHICLE SUSPENSION

(75) Inventor: Ki Chang Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 379 days.

(21) Appl. No.: 11/323,489

(22) Filed: Dec. 30, 2005

(65) Prior Publication Data

US 2007/0096421 A1    May 3, 2007

(30) Foreign Application Priority Data

Nov. 1, 2005    (KR)    .................. 10-2005-0103871

(51) Int. Cl.
*B60G 3/04*    (2006.01)
(52) U.S. Cl. .............................................. 280/124.134
(58) Field of Classification Search .......... 280/124.109, 280/124.134, 124.15
See application file for complete search history.

(56) References Cited

U.S. PATENT DOCUMENTS 5,918,893 A * 7/1999 Marquardt et al. ..... 280/124.109
6,446,991 B1 * 9/2002 Klais ........................ 280/86.75
6,572,126 B2 * 6/2003 Tunzini ............... 280/124.134
2007/0169982 A1 * 7/2007 Ogawa et al. ................ 180/312

FOREIGN PATENT DOCUMENTS

JP          06-179314       6/1994
JP          2003-294084     10/2003

* cited by examiner

*Primary Examiner*—Faye M. Fleming
(74) *Attorney, Agent, or Firm*—Morgan, Lewis & Bockius LLP

(57) ABSTRACT

A lower arm mounting structure of a vehicle suspension includes a first mount mounted to a wheel of a vehicle, a second mount mounted to a sub frame side member at one side of the sub frame side member, and a third mount mounted to the sub frame side member at the other side of the sub frame side member. The third mount is fastened to the sub frame side member at two points spaced apart from each other in a longitudinal direction of the sub frame side member by bolts. The lower arm mounting structure prevents the mounts from being displaced during the cornering of the vehicle. Accordingly, it is possible to reduce or eliminate the phenomenon that the front part of the vehicle is inclined, and to achieve an enhancement in vehicle handling performance.

6 Claims, 2 Drawing Sheets

LOWER ARM MOUNTING STRUCTURE OF VEHICLE SUSPENSION

CROSS-REFERENCE TO RELATED APPLICATION

This application claims priority to and the benefit of Korean Patent Application No. 10-2005-0103871 filed in the Korean Intellectual Property Office on Nov. 1, 2005, the entire contents of which are incorporated herein by reference.

BACKGROUND OF THE INVENTION

1. Field of the Invention

The present invention relates to a lower arm mounting structure of a vehicle suspension, and, more particularly, to a lower arm mounting structure which provides two-point support for a lower arm of the vehicle suspension mounted to a sub frame side member.

2. Description of the Related Art

In a conventional lower arm mounting structure, a lower arm of a suspension may include a first rod which is connected to a wheel of a vehicle, a second rod which extends from the first rod in one direction, and is connected to one side of a sub frame side member, and a third rod 108 which extends from the first rod in a direction opposite to the second rod, and is connected to the other side of the sub frame side member.

A first mount may be formed at a terminal end of the first rod to mount the first rod 104 to the wheel. A second mount may be formed at a terminal end of the second rod to mount the second rod to one side of the sub frame side member. A third mount may be formed at a terminal end of the third rod to mount the third rod to the other side of the sub frame side member.

A horizontal through hole through the third mount may be provided at the terminal end of the third rod. A rubber bush is fitted through the hole and thus, the third rod may be fastened to a mounting bracket formed at the other side of the sub frame side member by a bolt which extends through the rubber bush.

In a conventional lower arm, however, slight displacement occurs at the third mount when a lateral reaction force is applied to the third mount during cornering of the vehicle because the rubber bush fitted in the third mount is slightly elastically deformed due to the lateral reaction force. For this reason, excessive displacement occurs at the first mount, thereby causing the body of the vehicle to be inclined.

A sub frame is arranged beneath an engine room of the vehicle. The sub frame supports an engine and a transmission arranged at the top of the sub frame. The sub frame is also connected to the lower arm of the suspension at one side of the sub frame to secure a desired structural rigidity of the vehicle and to achieve an effective load distribution.

The load distribution path established during sharp cornering of the vehicle may be analyzed as follows. Primarily, a lateral reaction force caused by a reaction to turning of the vehicle is transmitted to the lower arm of the sub frame. Secondarily, the transmitted lateral reaction force is exhibited in the form of a torsion generated at openings in a passenger room of the vehicle. Thirdly, the residual lateral reaction force is exhibited in the form of a rear torsion generated at a rear floor of the passenger room, and thus, vibration.

Thus, the rubber bush used to mount the second mount to the sub frame is elastically deformed during cornering of the vehicle, so that the second mount is displaced relative to the sub frame. The displacement of the second mount causes the third mount to be displaced. As a result, an inclination of the vehicle body occurs.

SUMMARY OF THE INVENTION

Embodiments of the present invention provide a lower arm mounting structure of a suspension in a vehicle in which a mount of a lower arm has a plate structure to be fastened to a sub frame side member at two points spaced apart from each other in the longitudinal direction of the side member by bolts, thereby being capable of minimizing displacement of the mount, and thus, reducing or eliminating the phenomenon that the front part of the vehicle is inclined, and achieving an enhancement in vehicle handling performance.

In accordance with an exemplary embodiment of the present invention, a lower arm mounting structure of a vehicle suspension comprises a first mount which is mounted to a wheel of a vehicle, a second mount which is mounted to a sub frame side member at one side of the sub frame side member, and a third mount which is mounted to the sub frame side member at the other side of the sub frame side member. The third mount may be fastened to the sub frame side member at two points spaced apart from each other in a longitudinal direction of the sub frame side member by bolts.

The first mount may include a bolt fastening hole which allows the first mount to be fastened to the wheel by a bolt.

The second mount may include a vertical through hole formed through the second mount, and a bush fitted in the through hole. The second mount may be fastened to the sub frame side member by a bolt which extends through the bush.

The third mount may include a mounting plate integrally formed at a terminal end of a lower arm of the vehicle suspension such that the mounting plate extends in the longitudinal direction of the sub frame side member, and a bolt fastener formed at the other side of the sub frame side member, to fasten the mounting plate to the sub frame side member at the two points using the bolts.

The mounting plate may extend from the terminal end of the lower arm by a certain length in opposite directions perpendicular to a longitudinal direction of the lower arm. The mounting plate may include bolt fastening holes formed through opposite ends of the mounting plate, respectively. The bolts may be fastened to the bolt fastening holes, respectively.

The bolt fastener may have the form of a recess to receive the mounting plate. The bolt fastener may include bolt fastening holes formed in an inner surface of the bolt fastener at opposite sides of the bolt fastener, respectively, and a rigidity reinforcing rib formed at a central portion of the inner surface of the bolt fastener.

The rigidity reinforcing rib may have a stepped structure, and may be upwardly protruded from the sub frame side member.

BRIEF DESCRIPTION OF THE DRAWINGS

Features and advantages of the present invention will become more apparent after reading the following detailed description when taken in conjunction with the drawings, in which.

DESCRIPTION OF THE PREFERRED EMBODIMENTS

Now, exemplary embodiments of the present invention will be described in detail with reference to the annexed drawings.

Figure 1:
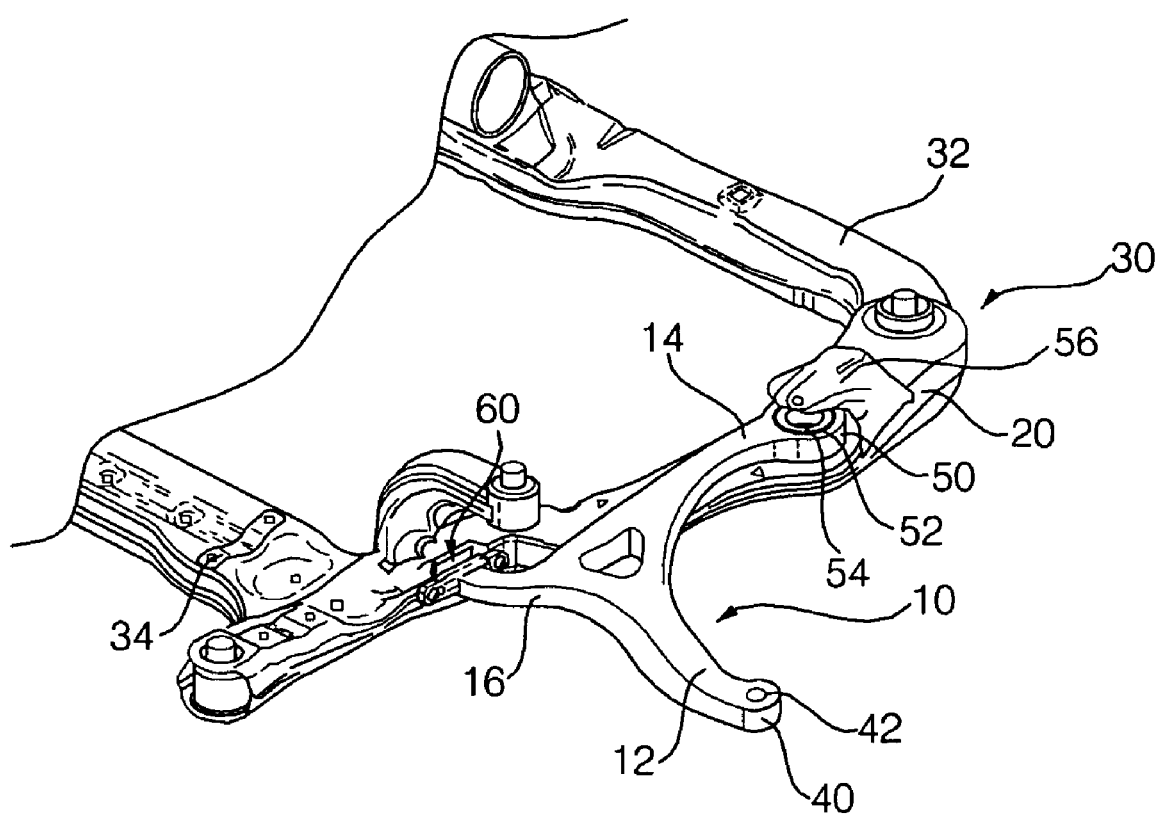
FIG. 1 is a perspective view illustrating a lower arm mounting structure of a vehicle suspension according to an exemplary embodiment of the present invention.

The lower arm, which is designated by reference numeral 10 in FIG. 1, includes a first rod 12 which is connected to a wheel of a vehicle, a second rod 14 which extends from the first rod 12 in one direction, and is connected to a front portion of a sub frame side member 20, and a third rod 16 which extends from the first rod 12 in a direction opposite to the second rod 14, and is connected to a rear portion of the sub frame side member 20.

The sub frame 30 includes a front member 32 which extends in a lateral direction of a vehicle body at a front side of the vehicle body. The side member 20 is also included in the sub frame 30. Although not shown, the sub frame 30 includes another side frame 20. The two side members 20 extend in a longitudinal direction of the vehicle body, and are connected to opposite ends of the front member 32, respectively. The sub frame further 30 further includes a rear member 32 which extends in the lateral direction of the vehicle body, and is connected to rear portions of the side members 20 at opposite ends of the rear member 32, respectively. For simplicity of description, the following description will be given only in conjunction with one side member 20 to which the lower arm 10 is mounted.

The lower arm 10 is mounted to the side member 20, and is connected to the wheel of the vehicle.

A first mount 40 is formed at a terminal end of the first rod 12 to mount the first rod 12 to the wheel. A second mount 50 is formed at a terminal end of the second rod 14 to mount the second rod 14 to the front portion of the sub frame side member 20. A third mount 60 is formed at a terminal end of the third rod 16 to mount the third rod 16 to the rear portion of the sub frame side member 20.

A vertical bolt fastening hole 42 is formed through the first mount 40, in order to allow the first mount 40, and thus, the first rod 12, to be fastened to the wheel by a bolt.

A vertical through hole 52 is formed through the second mount 50 provided at the terminal end of the second rod 14. A rubber bush 54 is fitted in the through hole 52. The second mount 50, and thus, the second rod 14, is fastened to a mounting bracket 56 formed at the front portion of the sub frame side member 20 by a bolt which extends through the rubber bush 54.

Figure 2:
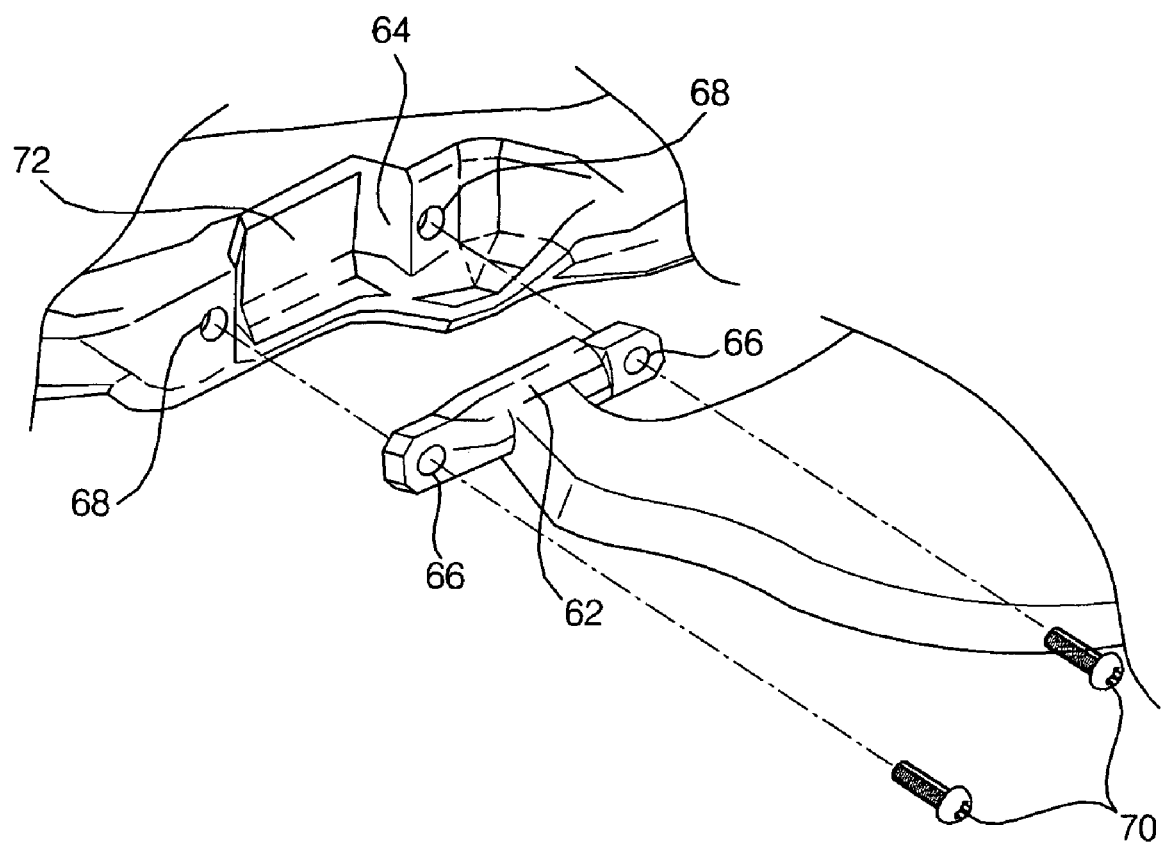
FIG. 2 is an exploded perspective view illustrating a lower arm and a sub frame according to an exemplary embodiment of the present invention.

As shown in FIG. 2, the third mount 60 includes a mounting plate 62 formed at the terminal end of the third rod 16 to extend in the longitudinal direction of the side member 20, and a bolt fastener 64 formed at the side member 20 to extend in the longitudinal direction of the side member 20, in order to fasten the mounting plate 20 to the side member 20 using a bolt.

The mounting plate 62 extends from the terminal end of the third rod 16 by a certain length in opposite directions perpendicular to a longitudinal direction of the third rod 16. Bolt fastening holes 66 are formed through opposite ends of the mounting plate 62, respectively. Bolts 70 may extend through the bolt fastening holes 66, respectively. The mounting plate 62 is integrated with the terminal end of the third rod 16.

The bolt fastener 64 has the form of a recess so that the mounting plate 62 is received in the bolt fastener 64. Bolt fastening holes 68 are formed in an inner surface of the bolt fastener 64 at opposite sides of the bolt fastener 64, respectively. A rigidity reinforcing rib 72 is formed at a central portion of the inner surface of the bolt fastener 64, in order to locally increase the rigidity of the bolt fastener 64.

The rigidity reinforcing rib 72 has a stepped structure, and is upwardly protruded from the side member 20.

The lower arm mounting structure having the above-described configuration according to the present invention can minimize elastic deformation of the rubber bushes caused by a lateral reaction force generated during cornering of the vehicle because the third mount 60 is fastened to the sub frame 30 at two points spaced apart from each other in a longitudinal direction of the sub frame 30 by the bolts 70. Accordingly, it is possible to prevent the lower arm mounting structure from being displaced during the cornering of the vehicle, and thus, to reduce or eliminate the phenomenon that the front part of the vehicle is inclined.

As apparent from the above description, the lower arm mounting structure according to embodiments of the present invention in which the mount of the lower arm is fastened to the sub frame side member at two points spaced apart from each other in the longitudinal direction of the side member by bolts, to minimize displacement of the mount. Accordingly, it is possible to reduce or eliminate the phenomenon that the front part of the vehicle is inclined, and to achieve an enhancement in vehicle handling performance.

Although exemplary embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A lower arm mounting structure of a vehicle suspension comprising:

a first mount configured to be mounted to a wheel of a vehicle;

a second mount configured to be mounted to a sub frame side member at one side of the sub frame side member; and a third mount configured to be mounted to the sub frame side member at the other side of the sub frame side member, wherein the third mount includes:

a mounting plate integrally formed at a terminal end of a lower arm of the vehicle suspension, wherein the mounting plate includes first bolt fastening holes formed through opposite ends of the mounting plate;

a bolt fastener formed at the other side of the sub frame side member, wherein the bolt fastener includes second bolt fastening holes formed in an inner surface of the bolt fastener at opposite sides of the bolt fastener; and bolts fastened to the first and second bolt fastening holes to fasten the mounting plate to the sub frame side member.

2. The lower arm mounting structure according to claim 1, wherein the first mount includes an additional bolt fastening hole which allows the first mount to be fastened to the wheel by an additional bolt.

3. The lower arm mounting structure according to claim 1, wherein:

the second mount includes a vertical through hole formed through the second mount, and a bush fitted in the through hole; and the second mount is fastened to the sub frame side member by an additional bolt which extends through the bush.

4. The lower arm mounting structure according to claim 1, wherein:

the mounting plate extends from the terminal end of the lower arm by a predetermined length in opposite directions perpendicular to a longitudinal direction of the lower arm.

5. The lower arm mounting structure according to claim 1, wherein:
the bolt fastener has the form of a recess to receive the mounting plate; and
the bolt fastener includes a rigidity reinforcing rib formed at a central portion of the inner surface of the bolt fastener.

6. The lower arm mounting structure according to claim 5, wherein the rigidity reinforcing rib has a stepped structure, and is upwardly protruded from the sub frame side member.

* * * * *